United States Patent [19]
Heffner

[11] Patent Number: 5,298,972
[45] Date of Patent: Mar. 29, 1994

[54] METHOD AND APPARATUS FOR MEASURING POLARIZATION SENSITIVITY OF OPTICAL DEVICES

[75] Inventor: Brian L. Heffner, Redwood City, Calif.

[73] Assignee: Hewlett-Packard Company, Palo Alto, Calif.

[21] Appl. No.: 755,931

[22] Filed: Sep. 6, 1991

Related U.S. Application Data

[63] Continuation-in-part of Ser. No. 601,613, Oct. 17, 1990, abandoned, which is a continuation-in-part of Ser. No. 468,397, Jan. 22, 1990, abandoned.

[51] Int. Cl.$^5$ .............................................. G01J 4/04
[52] U.S. Cl. .............................................. 356/364
[58] Field of Search .............. 356/364, 365, 366, 367; 250/225

[56] References Cited

U.S. PATENT DOCUMENTS

| | | | |
|---|---|---|---|
| 3,556,662 | 1/1971 | Levenstein et al. | 356/365 |
| 4,158,506 | 6/1979 | Collett | 356/365 |
| 4,306,809 | 12/1981 | Azzam . | |
| 4,671,657 | 6/1987 | Calvani et al. . | |
| 4,671,660 | 6/1987 | Distl et al. . | |
| 4,681,450 | 7/1987 | Azzam | 356/367 |
| 4,904,085 | 2/1990 | Spillman et al. | 356/364 |
| 4,999,014 | 3/1991 | Gold et al. | 356/382 |

FOREIGN PATENT DOCUMENTS

| | | | |
|---|---|---|---|
| 0249235 | 6/1967 | European Pat. Off. | G01B 11/06 |
| 871113932 | 8/1987 | European Pat. Off. | G01J 9/04 |
| 893074776 | 7/1988 | European Pat. Off. | G01J 4/04 |
| 0352133 | 7/1989 | European Pat. Off. | G01J 4/04 |
| 2570186 | 9/1984 | France | G01J 4/04 |
| 1343253 | 10/1987 | U.S.S.R. | 356/364 |
| WO86/07631 | 12/1986 | World Int. Prop. O. | G01J 4/04 |

OTHER PUBLICATIONS

"Polarization Stabilization on Single-Mode Fiber", R. Ulrich, Appl. Phys. Lett. 35(11), Dec. 1, 1979.
"Polarization Fluctuations of Optical Fibre Submarine Cable in 6000m Deep Sea Trial", Electronics Letters, May 12, 1988.
"Polarization Fluctuations in a 147 km Undersea Lightwave Cable During Installation", Electronics Letters, Oct. 8, 1987.
"General Analysis and Optimization of the Four-Detector Photopolarimeter", R. A. M. Azzam, I. M. Elminyawi, and A. M. El-Saba, J. Opt. Soc. Am. A., May 5, 1988.
"Real-Time Heterodyne Fiber Polarimetry with Narrow-and-Broad-Band Sources", Riccardo Calvani, Renato Caponi, and Francesco Cisternino, Journal of Lightwave Technology, Jul. 1986.
"Construction, Calibration and Testing of a Four-Detector Photopolarimeter", R. M. A. Azzam, E. Masetti, I. M. Elminyawi, and F. G. Grosz, Rev. Sci. Instrum. Jan. 1988.
"Determination of the Ellipsometric Characteristics of Optical Surfaces Using Nanosecond Laser Pulses", Edward Collett, Surface Science96 (1980) 156-167.
"Ellipsometry with Pulsed Tunable Laser Sources", Dill et al., IBM Technical Disclosure Bulletin, vol. 19, No. 4 (Sep. 1976), pp. 1487-1489.
S. R. Cloude, "Group Theory and Polarization Algebra", OPTIK, Dec. 1986, No. 1, Stuttgart, W. Germany, p. 26-36.

Primary Examiner—Richard A. Rosenberger

[57] ABSTRACT

An instrument includes a polarized optical source for producing three sequential predetermined states of polarization of a light beam and an optical polarization meter for measuring the polarization of a portion of the light beam transmitted by or reflected from an optical network by splitting it into four beams, passing three of the beams through optical elements, measuring the transmitted intensity of all four beams, and calculating Stokes parameters. The light beam enters the optical polarization meter through a single-mode optical fiber that acts as a spatial filter for controlling the position and alignment of the beam with respect to the optical elements. The distortion of the light beam polarization caused by this optical fiber is corrected by introducing two different linearly polarized light beams and measuring Stokes parameters which are used to construct a calibration matrix that is inverted and multiplied times measured Stokes parameters of subsequent measurements to yield true Stokes parameters. The three sequential predetermined states of polarization yield three corresponding Jones input vectors, and the Stokes parameters for the responses of the optical network are converted to three Jones output vectors. A Jones matrix for the optical network to within a complex constant is then computed from the Jones input and output vectors. Relative polarization sensitivity can be determined from this matrix for the optical network. The relative distortion caused by the optical network can be corrected by multiplying by the inverse of the matrix during later measurements through the optical network. Additionally, power measurements on the optical network and a substituted optical through enable absolute determinations and corrections.

23 Claims, 7 Drawing Sheets

METHOD AND APPARATUS FOR MEASURING POLARIZATION SENSITIVITY OF OPTICAL DEVICES

CROSS-REFERENCE TO RELATED APPLICATION

This is a continuation-in-part of copending U.S. Pat. application Ser. No. 07/601,613 filed Oct. 17, 1990 now abandoned which in turn is a continuation-in-part of 07/468,397 filed Jan. 22, 1990 now abandoned.

BACKGROUND OF THE INVENTION

This invention relates to the field of electronic instruments for measuring the polarization state of a beam of light and, more particularly, to such instruments that are capable of detecting effects on the polarization state of an incident light beam caused by an optical device under test (i.e., an optical system, subsystem, or component). Specifically, one embodiment of the invention provides a method and apparatus for impinging a light beam having predetermined states of polarization on an optical device under test to ascertain a response characteristic of the optical device to different polarization states and determining the polarization sensitivity of the optical device. One embodiment of the invention provides automatic polarization sensitivity determination to ascertain, for example, maximum and minimum transmission (or maximum and minimum reflection) of an optical device under test in response to the different possible states of polarization of an incident light beam, and the respective polarization states at which the maximum and the minimum transmission (or maximum and minimum reflection) occur.

There are various known techniques for measuring the polarization state of a light beam. The conventional technique for measuring the polarization state of a light beam is to align a waveplate and a linear polarizer in the optical path of the beam. The waveplate is configured to be rotatable about the optical axis, and is typically a quarter-wave plate. An optical sensor, such as a photodetector, is positioned downstream to measure the intensity of light transmitted by the waveplate and the polarizer.

In operation, the waveplate is sequentially rotated to a plurality of angular positions about the optical axis relative to the linear polarizer, and the transmitted light intensity is measured at each angular position by the photodetector. Intensity measurements at a minimum of four different angular positions are required for a determination of the state of polarization of the light beam. As is well-known, the polarization state of the light beam can be computed from these intensity measurements.

This technique has the drawback that it requires mechanical movement of the waveplate. Therefore, the speed of measurement of the polarization state is limited by the speed with which the waveplate can be rotated, and, in the case that the waveplate is rotated manually, measurement of the polarization state is time-consuming and inconvenient.

An apparatus that overcomes the above limitation is disclosed in U.S. Pat. No. 4,681,450 and in Azzam, R.M.A., et al., "Construction, Calibration, and Testing of a Four-Detector Photopolarimeter," *Rev. Sci. Instruments,* 59(1), January, 1988, pages 84–88. This apparatus comprises a series of four photodetectors serially located in the path of a light beam whose polarization state is to be measured. The light beam successively strikes each of the first three photodetectors obliquely, and is partially specularly reflected. Each specular reflection changes the state of polarization of the reflected light beam. Each photodetector produces an electrical signal proportional to the absorbed portion of the optical energy. The light beam is substantially fully absorbed in the fourth photodetector. The electrical signals produced by the four photodetectors can be used to calculate the Stokes parameters of the incident light beam, which determines the polarization state of the beam. Since this apparatus does not involve any mechanical movement, it does not have the speed limitation of the previously described apparatus or the inconvenience of a manual measurement.

The apparatus disclosed in U.S. Pat. No. 4,681,450 does, however, suffer from the drawback that the change in the polarization state of the light beam reflected at each of the photodetector surfaces is substantially wavelength-dependent. This apparatus must be calibrated by using four calibration light beams of different known polarization states. The calibration must be repeated for each different wavelength. Furthermore, at least one of the calibration light beams must not be linearly polarized; and such a beam is inconvenient to generate accurately. Calibration of the apparatus disclosed in U.S. Pat. No. 4,681,450 is, therefore, a formidable task. Consequently, the efficiency and accuracy of the apparatus is limited, particularly when polarization states of several different light beams are to be measured.

Another apparatus for performing polarization measurements is disclosed in U.S. Pat. No. 4,158,506. This apparatus, which is indicated to be suitable for measuring the polarization state of nanosecond optical pulses, comprises an assembly of six photodetectors positioned behind a corresponding assembly of linear polarizers and waveplates. A light beam passes through all of the linear polarizers simultaneously, and the transmitted light intensity from each polarizer is detected and measured by a corresponding photodetector. The electrical signals produced by the six photodetectors can then be used to determine the Stokes parameters of the incident light beam to indicate its polarization state.

Finally, another optical polarization measurement apparatus is disclosed in European Patent Application No. 8817382. In this apparatus, an incident light beam passes through a beam expander, and four separate portions of the beam pass through four coplanar Stokes filters. The four portions of the light beam are focused onto four associated photodetectors that measure the intensities of the received light. The electrical signals produced by the photodetectors are used to determine the Stokes parameters of the incident light beam to indicate its polarization state.

The apparatuses disclosed in U.S. Pat. No. 4,681,450 and European Patent Application No. 8817382 suffer from the same drawback, in that there is no provision for ensuring that the incident light beam whose polarization state is to be measured is properly aligned relative to the optical elements so that all photodetectors are subjected to the same beam. Furthermore, there is no provision for calibrating either apparatus. While European Patent Application No. 8817382 discloses an optical fiber input, and describes the phenomenon of "polarization noise" that results from transmission of a light beam through fiber optic material, no technique is disclosed for correcting for the polarization distortion of the input fiber.

Additionally, U.S. Pat. No. 4,306,809 describes apparatus having optical elements that are rotated automatically for determining the polarizing properties of a material on which a light beam impinges by measuring the Mueller matrix. However, neither this apparatus, nor the apparatuses described above, enable the polarization sensitivity of an optical device to be determined in response to various polarization states of an incident light beam.

In this regard, accurate characterization of optical devices is becoming increasingly important as optical devices become more complex and applications for optical devices proliferate, for example, in fiber optic telecommunications. One of the fundamental specifications of any optical device with an optical input and an optical output is polarization sensitivity, that is, the variation of optical power transmitted through the device (or reflected by the device) as the state of polarization incident on the input of the optical device is varied. For example, the splitting ratio and excess loss of a fiber optic directional coupler, the insertion loss of an optical isolator, and the gain of an optical amplifier all can exhibit variation as the input state of polarization is altered. In order to use such an optical device effectively in most practical applications, the polarization sensitivity of its transmission and/or reflection characteristics must be known.

Conventionally, polarization sensitivity of an optical device under test (DUT) has been directly measured by monitoring the output power of the optical DUT with a polarization-independent detector or optical power meter while the input state of polarization of an optical source is varied over all possible polarization states. This is a difficult and time-consuming technique.

Moreover, many arrangements have been devised to transform the fixed output state of polarization of an optical source into any desired state of polarization. Such arrangements are generally referred to as polarization controllers. For example, two independently rotatable quarter-wave plates constitute a polarization controller suitable for a light beam propagating through open space, and two or more single-mode optical fiber loops of variable orientation can serve as a polarization controller in fiber optic systems. See, LeFevre, H. C., "Single-mode fibre fractional wave devices and polarisation controllers," *Elect. Lett.*, 16, 1980, pages 778-780. Both of these polarization controllers are manually driven and do not lend themselves to automation.

Alternatives for polarization controllers exist which can be electronically controlled. For example, polarization controllers based on stain-induced birefringence in an optical fiber, which is effected by piezoelectric or electromagnetic elements, have been demonstrated, as have polarization controllers based on electro-optic crystals or waveguides. See, Walker, N. G., and Walker, G. R., "Polarization control for coherent communications," *J. Lightwave Technol.*, 8, 1990, pages 438-458. These polarization controllers are more easily automated, but an instrument employing any such polarization controller to measure polarization sensitivity has two fundamental disadvantages. One disadvantage is that the control inputs to a polarization controller do not correlate to the output state of polarization in an easily ascertainable manner, especially as the wavelength of the optical source varies. Moreover, the output intensity of the polarization controller is usually a weak function of the control inputs, and this variability in intensity translates directly into inaccuracy in the overall measurement. A second, more serious disadvantage is the necessity of a search algorithm. The state of a completely (not partially) polarized optical source has two degrees of freedom, so it is necessary to vary the state of polarization at the output of the polarization controller over a two-dimensional space while searching for the maximum and minimum transmission (or reflection).

Therefore, a method and apparatus for facilitating determination of polarization sensitivity of an optical device under test to various polarization states of an incident light beam are needed so that the response characteristic of the optical device to different polarization states can be assessed, for example, during the design of the optical device. Moreover, such a polarization sensitivity determination desirably would be calibrated, accurate, and rapidly obtained, as well as convenient to perform.

SUMMARY OF THE INVENTION

It is an object of this invention to provide an instrument that is capable of generating different states of polarization of a light beam and measuring the polarization states produced by the effect of an optical device under test on the beam to enable polarization sensitivity of the optical device to be determined.

Another object is to provide an instrument that determines such polarization sensitivity over a substantial range of wavelengths.

A further object of the invention is to provide an instrument for determining polarization sensitivity that is convenient to calibrate accurately.

Yet another object of the invention is to provide a method for calibrating an instrument to correct for the distortion of the polarization state caused by input fiber optics of an optical polarization meter incorporated into the instrument by using no more than two reference light beam sources of known polarization.

Another object of the invention is to provide a method for calibrating such an instrument to correct for the distortion of the polarization state caused by any optical network, which is not completely polarizing, in the input path of an optical polarization meter incorporated into the instrument by using no more than three reference light beam sources of known polarization.

One embodiment of the present invention provides a method and apparatus for determining polarization sensitivity of the transmission or reflection of an optical device under test using a polarized optical source, which provides at least three states of polarization, and an optical polarization meter. The method in accordance with one embodiment of the invention measures the responses of an optical device under test to an incident light beam by providing a light beam having three sequential polarization states, corresponding to three Jones input vectors, impinging the beam on the optical device, and splitting the transmitted or reflected beam into four beams, passing three of the beams through optical elements, and measuring the intensities of all four beams by means of photodetectors. The Stokes parameters are then calculated from the results of these measurements and converted to Jones output vectors. The Jones matrix for the optical device under test is then computed to within a complex constant. Thereafter, the relative polarization sensitivity of the optical device under test can be determined from this matrix.

Preferably, an optical source is connected to a polarization synthesizer which is used to sequentially transform the state of polarization of the light beam generated by the optical source to three known states of polarization, for example, horizontal, 60-degree, and 120-degree linear polarization states. The three states of polarization need not be of the same intensity. The light beam produced by the polarization synthesizer is fed to the optical device under test having an unknown Jones matrix. The light beam is impinged on the optical device under test, and the transmitted or reflected portion of the light beam is routed to the optical polarization meter which measures the state of polarization. The optical polarization meter need not measure optical power.

The optical device under test can be situated in an open beam, or connections can be effected with single-mode optical fiber. The polarization dependence of the transmission loss of a single-mode optical fiber is typically small enough that it cannot be measured and can, therefore, be ignored.

In the optical polarization meter, the received portion of the light beam is subdivided into four beams and processed by three sets of optical elements. One of the optical elements is a horizontal linear polarizer, the second is a linear polarizer with a polarization direction oriented at a 45-degree angle about the optical axis relative to the first, and the third element is a circular polarizer. Measurement of the fourth beam provides a normalizing factor proportional to the total incident intensity, that enables determination of all four Stokes parameters. The received portion of the light beam preferably enters the optical polarization meter through a single-mode optical fiber that acts as a spatial filter which, together with other optical elements, controls the position and alignment of the received portion of the light beam in the optical polarization meter. An optical fiber calibration method is provided to correct for polarization distortion caused by the fiber optic input by using two reference light sources of known linear polarization.

The three known sequential input states of polarization produced by the polarization synthesizer yield three Jones input vectors. The Stokes parameters for the response of the optical device to each of three sequential polarization states are converted to three corresponding Jones output vectors. The Jones matrix for the optical device under test is then computed to within a complex constant from the Jones input and output vectors. Finally, relative polarization sensitivity can be determined from this matrix for the optical device under test. Also, if it is desired to calibrate out the effect of any optical network which is not completely polarizing, including the optical device under test, the relative distortion of the polarization state caused by the optical network can be corrected by determining the matrix of the optical network using the three sequential input states of polarization and multiplying Jones output vectors by the inverse of the matrix of the optical network during all subsequent measurements through the optical network. Additionally, power measurements on the optical device under test and/or optical network, as well as a substituted optical through (the atmosphere or a single-mode optical fiber), enable the Jones matrix to be computed so that absolute polarization sensitivity can be determined and absolute calibrations can be performed.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings.

DETAILED DESCRIPTION OF THE PREFERRED EMBODIMENTS

Figure 1:
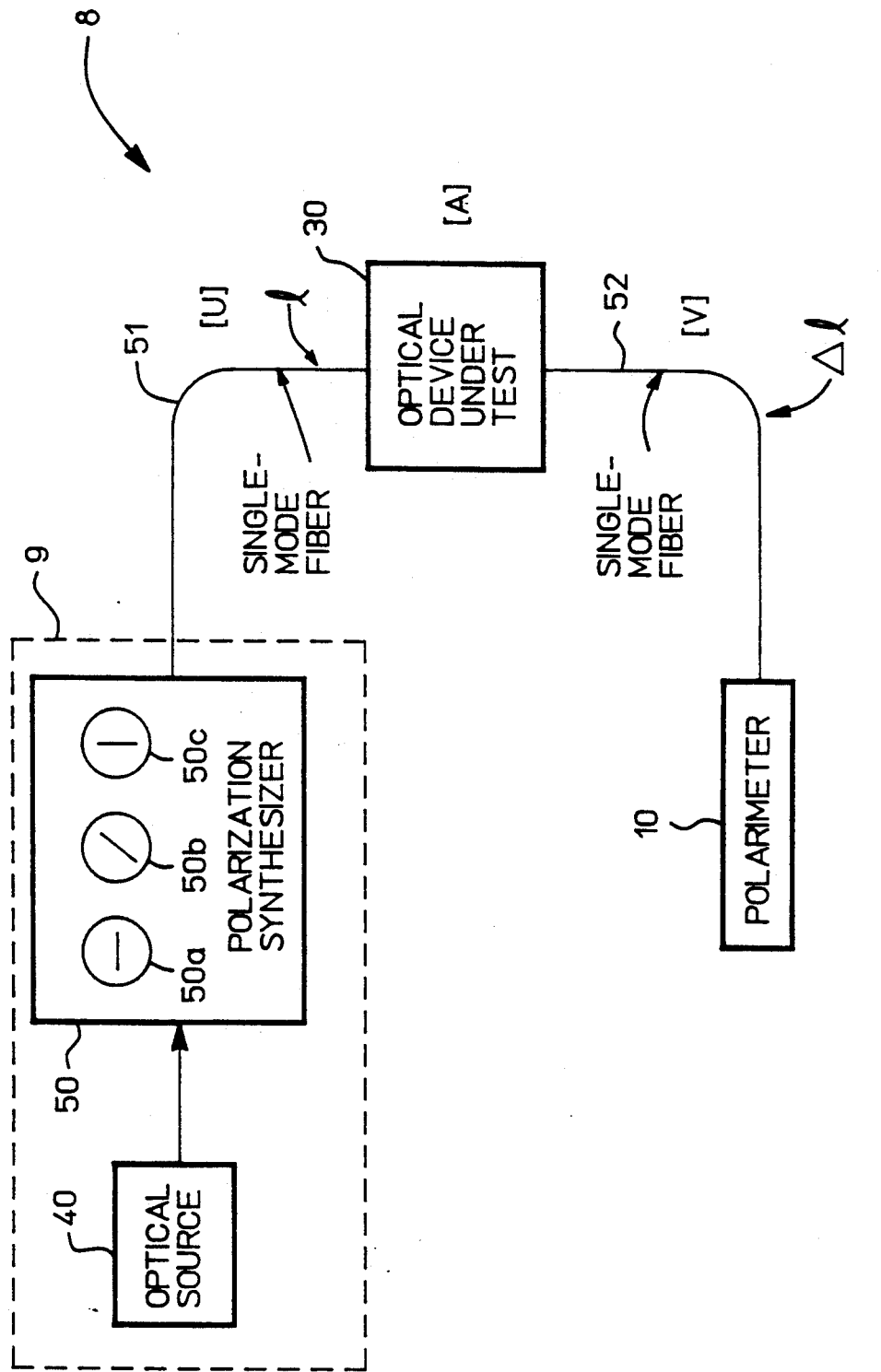
FIG. 1 is a schematic diagram of an instrument for determining the polarization sensitivity of an optical device under test in accordance with the invention based on transmission measurements.

One embodiment of an instrument for achieving calibrated, accurate, convenient polarization sensitivity determinations in accordance with the invention, generally indicated by the numeral 8, is shown in FIG. 1. The instrument 8 comprises a polarized optical source 9 for feeding a light beam 1 to an optical device under test (DUT) 30, and an optical polarization meter 10 for receiving a portion of the light beam Δ1 transmitted by the optical DUT. Actually, the polarized optical source 9 can comprise an optical source 40 and a polarization synthesizer 50, as indicated by the dashed lines surrounding these elements in FIG. 1. For example, the optical source 40 can be a solid-state laser which generates a light beam at a given wavelength, such as 1300 nanometers. The polarization synthesizer 50 is preferably automated to sequentially insert three different polarizers 50a, 50b, and 50c into the path of the light beam generated by the optical source 40 to produce three sequential states of polarization of the light beam 1. Conveniently, the polarizers 50a, 50b, and 50c preferably transmit linear polarization states, but, alternatively, they can be selected to transmit elliptical states of polarization. Other polarization generators can also be used, including a variable or rotatable waveplate.

Figure 2:
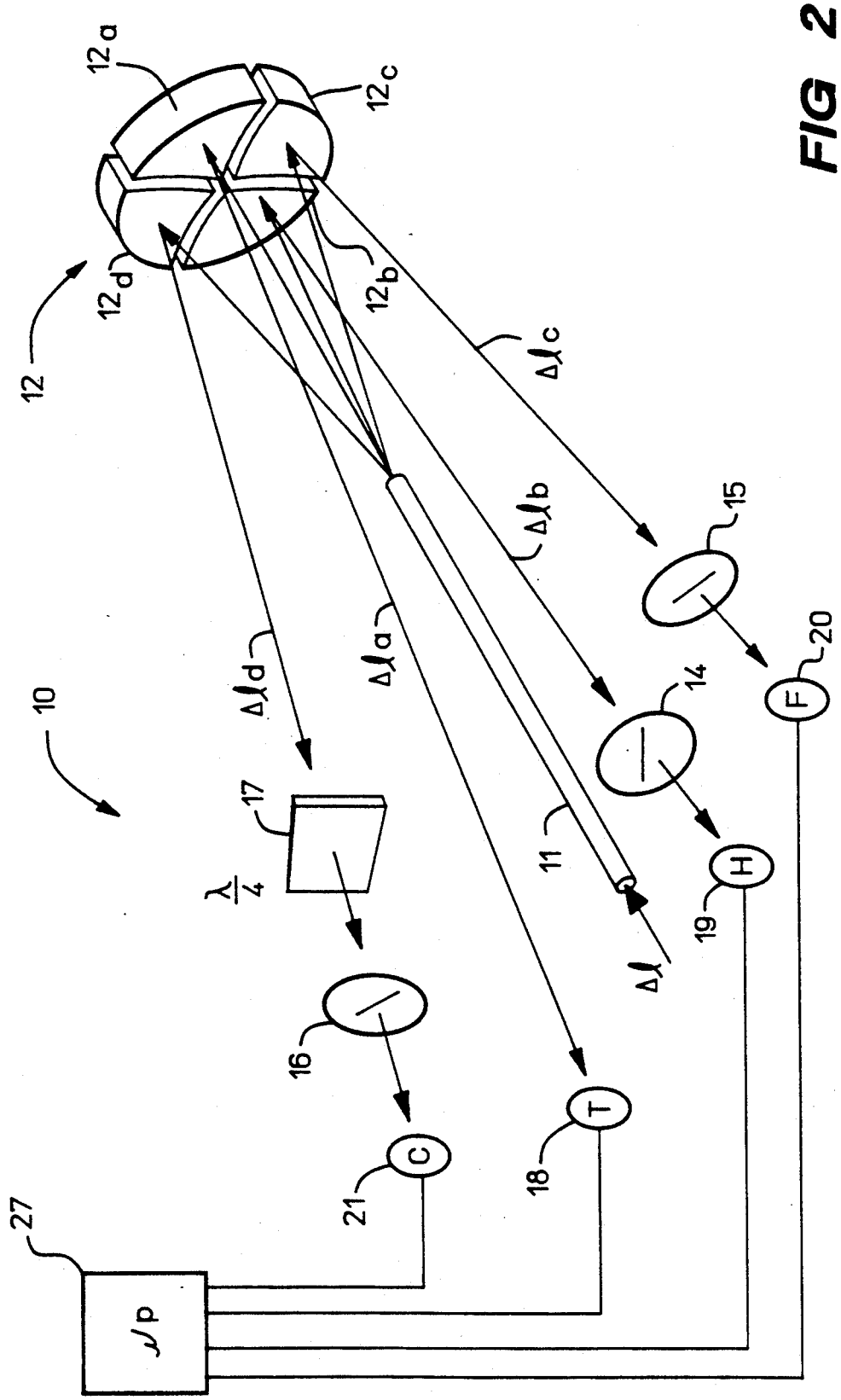
FIG. 2 is a schematic diagram in perspective view of an optical polarization meter incorporated into the instrument shown in FIG. 1, illustrating the optical path of the received portion of the light beam from an optical device under test.

As shown in FIG. 2, the portion of the light beam Δ1 transmitted by the optical DUT 30 enters the optical polarization meter 10 through a single-mode optical fiber 11, which provides spatial filtering of the beam. A method for calibrating to correct for the distortion of the polarization state caused by the input optical fiber 11 by using no more than two reference light beams of known polarization will be described later.

The optical polarization meter 10 can operate in the range of wavelengths over which the input optical fiber 11 supports a single mode of propagation. For example, a standard long-haul telecommunications fiber manufactured by Corning Glass for 1.3-micron transmission can support a single propagation mode over the wavelength range of 1.2–1.6 micrometers.

The light beam Δ1 proceeds into a focusing concave mirror 12 sectioned into independently movable quadrants 12a, 12b, 12c, and 12d. The efficiency and accuracy of the optical polarization meter 10 are enhanced by the spatial filtering function of the input optical fiber 11 which ensures that the light beam Δ1 is repeatably distributed among the quadrants 12a–12d. The focusing concave mirror 12 splits the beam into four separate beams, as shown in FIG. 2. The four beams are sufficiently separated to allow different optical elements to be placed in their path. The beams are denoted by "Δ1a," "Δ1b," "Δ1c," and "Δ1d,"

The beam labelled "Δ1b" passes through a linear polarizer 14 having a horizontal polarization axis. Beam "Δ1c" passes through a linear polarizer 15 having a polarization axis oriented at a 45-degree angle about the optical axis relative to the linear polarizer 14. Beam "Δ1d" passes through a quarter-wave plate 17, and then through a linear polarizer 16 that is oriented in the same direction as the linear polarizer 15; this combination is a circular polarizer. Finally, beam "Δ1a" has no optical elements in its path.

The four beams "Δ1a"–"Δ1d" impinge on a respective photodetector 18, 19, 20, or 21 and are substantially absorbed. Each photodetector 18–21 produces an electrical signal that is proportional to the intensity of the optical energy absorbed. The photodetector 18 produces a signal of amplitude T, photodetector 19 produces a signal H, photodetector 20 produces a signal F, and photodetector 21 produces a signal C. The measurement frequency of the optical polarization meter 10 is limited only by the frequency response of the photodetectors 18–21, which can easily exceed 1 GHz.

Each quadrant 12a–12d of the focusing concave mirror 12 is adjusted to focus the portion of the light beam Δ1 impinging on it onto the corresponding photodetector 18–21 either directly or through the optical elements 14–17, as the case may be. The adjustment mechanism for the quadrant mirror sections 12a–12d is not shown, since it can be constructed readily by persons of skill in the field of the invention.

The electrical signals produced by the photodetectors 18–21 are routed to a microprocessor 27 having an analog-to-digital converter circuit. The amplitude of the electrical signals produced by the photodetectors 18–21 can be used to determine the Stokes parameters of the portion of the light beam Δ1 transmitted by the optical DUT 30 shown in FIG. 1. For purposes of this description, definition of the Stokes parameters is based on the well-known treatise entitled Principles of Optics, by M. Born and E. Wolf (Pergamon Press, 4th Edition, London, 1970, pages 30–32). These parameters are denoted by the symbols "$s_0$," "$s_1$," "$s_2$," and "$s_3$," and specification of all four of these quantities, based on the known configuration of the optical elements 14–17 and the intensities measured by the photodetectors 18–21, determines the state of polarization of the light beam 1Δ. The electrical signals T, H, F, and C produced by the photodetectors 18–21 are related to the Stokes parameters by the expressions:

$$s_0 = T; \quad (1)$$

$$s_1 = 2H - T; \quad (2)$$

$$s_2 = 2F - T; \quad (3)$$

$$s_3 = 2C - T. \quad (4)$$

The Stokes parameter $s_0$ is simply the total light intensity. The Stokes parameters $s_1$, $s_2$, and $s_3$ are determined from the electrical signals produced by the photodetectors 18–21 by Equations (2)–(4). The degree of polarization is given by the expression:

$$D = \frac{\sqrt{s_1^2 + s_2^2 + s_3^2}}{s_0}. \quad (5)$$

Such calculations can be carried out automatically by the microprocessor 27 shown in FIG. 2.

Previously, to measure polarization sensitivity of an optical device under test (DUT), the polarization sensitivity of the optical DUT has been directly measured by monitoring the output power of the optical DUT with a polarization-independent detector or optical power meter, while the input state of polarization of an optical source is varied over all possible polarization states. The accuracy and convenience of the conventional polarization sensitivity measurement have, however, been less than desirable.

For the purposes of the following description, determination of polarization sensitivity of the optical DUT 30 shown in FIG. 1 will be described for the case entailing measurements of transmission of the light beam 1 through the optical DUT. Alternatively, measurements of reflection can be performed instead of transmission measurements by employing a beam splitter or directional coupler, as will be briefly described later. Determination of polarization sensitivity based on either transmission or reflection measurements can be understood by analyzing the case of transmission, which will now be described.

A suitable description of polarization sensitivity depends upon the topology of the optical DUT. The polarization sensitivity of a simple optical network having one optical input and one optical output can be characterized by a single real number which expresses the ratio of the maximum to the minimum intensity transmission coefficient as the input state of polarization of the incident light beam is varied over all possible polarization states. Similarly, an optical network having n inputs and m outputs can be characterized by an n×m matrix of real numbers, each number denoting the polarization sensitivity of a particular input-output pair. The method for determining polarization sensitivity in accordance with the invention applies to any optical network.

A useful, compact formalism for the treatment of polarization characteristics in optical systems was introduced by R. C. Jones during the years 1941–1956. See, Jones, R. C., "A new calculus for the treatment of optical systems. I. Description and discussion of the calculus," *J. Optical Soc. Am.*, 31, 1941, pages 488–493; "A new calculus for the treatment of optical systems. II. Proof of three general equivalence theorems," *J. Optical Soc. Am.*, 31, 1941, pages 493-499; "A new calculus for the treatment of optical systems. III. The Sohncke theory of optical activity," *J. Optical Soc. Am.*, 31, 1941, pages 500-503; "A new calculus for the treatment of optical systems. IV.," *J. Optical Soc. Am.*, 32, 1942, pages 486-493; "A new calculus for the treatment of optical systems. V. A more general formulation and description of another calculus," *J. Optical Soc. Am.*, 37, 1947, pages 107-110; "A new calculus for the treatment of optical systems. VI. Experimental determination of the matrix," *J. Optical Soc. Am.*, 37, 1947, pages 110-112; "A new calculus for the treatment of optical systems. VII. Properties of the N-matrices," *J. Optical Soc. Am.*, 38, 1948, pages 671-685; "A new calculus for the treatment of optical systems. VIII. Electromagnetic theory," *J. Optical Soc. Am.*, 46, 1956, pages 126-131. A synopsis of the Jones calculus is presented in Chapter 4 of Kliger, D. S., Lewis, J. W., and Randall, C. E., *Polarized light in optics and spectroscopy*, Academic Press, San Diego, 1990.

Generally, Jones derived an explicit expression for experimentally determining the forward transmission matrix M of an unknown, linear, time-invariant optical device (Jones, R. C., "A new calculus for the treatment of optical systems. VI. Experimental determination of the matrix," *J. Optical Soc. Am.*, 37, 1947, pages 110-112). This restriction precludes optical devices that generate new optical frequencies different from those of the incident light beam.

Also, a Jones vector cannot be employed to represent a partially polarized field. However, this is not a practical limitation, since a light beam from an optical source can be completely polarized by a linear polarizer.

Furthermore, a Jones matrix cannot represent a depolarizing optical DUT. However, depolarizing effects can be eliminated by using a quasi-monochromatic optical source with a sufficiently long coherence length.

Subject to these constraints, the Jones calculus can express an input optical electric field by a one-by-two complex column field vector which completely specifies the phase and state of polarization of a light beam, such as the light beam 1 shown in FIG. 1. The two complex elements of this vector represent the amplitude and phase of the x and y components of the optical electric field, respectively. An optical DUT, such as the optical DUT 30, is represented by a complex two-by-two matrix. The effect of an optical DUT on an input optical electric field is found by multiplying the field vector by the matrix representing the optical DUT to obtain an output optical electric field vector which represents the transmitted portion of the light beam $\Delta 1$.

By way of contrast, one embodiment of the method in accordance with the invention for determining polarization sensitivity of the optical DUT 30 is based on specification of the input optical electric field Jones vectors for three known states of polarization of the light beam 1, performing intensity measurements on the transmitted portion of the light beam $\Delta 1$ needed to derive the output optical electric field Jones vectors, and computing the Jones matrix for the optical DUT 30 from the input and output Jones vectors. Thereafter, the method of the invention determines the polarization sensitivity of the optical DUT 30 from the computed Jones matrix. This provides an accurate determination of the polarization sensitivity of the optical DUT 30, as well as minimizes the number of actual measurements that must be performed, and, therefore, is rapid and convenient. Advantageously, this method also enables calibration to correct for the distortion of the polarization state caused by any optical network, which is not completely polarizing, in the input path of the optical polarization meter 10 by using no more than three reference light beams of known polarization, as will be described later. First, however, the polarization sensitivity determination method of the invention will be described in more detail.

One embodiment of the method in accordance with the invention determines the polarization sensitivity of the transmission of the optical DUT 30 shown in FIG. 1 in response to three sequential known states of polarization of the light beam 1. The output of the optical source 40 is connected to the input of the polarization synthesizer 50 which is used to sequentially transform the state of polarization of the beam of light generated by the optical source 40 to three sequential predetermined polarization states, for example, horizontal, 60-degree, and 120-degree linear polarization. The three states of polarization need not be of the same intensity.

The output of the polarization synthesizer 50 is connected to the input of the optical DUT 30. The optical DUT 30 has an unknown transmission Jones matrix. As will be shown, polarization sensitivity of the optical DUT 30 can be determined from this Jones matrix once the matrix is determined. In accordance with the method of the invention, the unknown Jones matrix is computed from the measured responses (Stokes parameter measurements) of the optical DUT 30 to the three sequential predetermined polarization states of the light beam 1.

Figure 3:
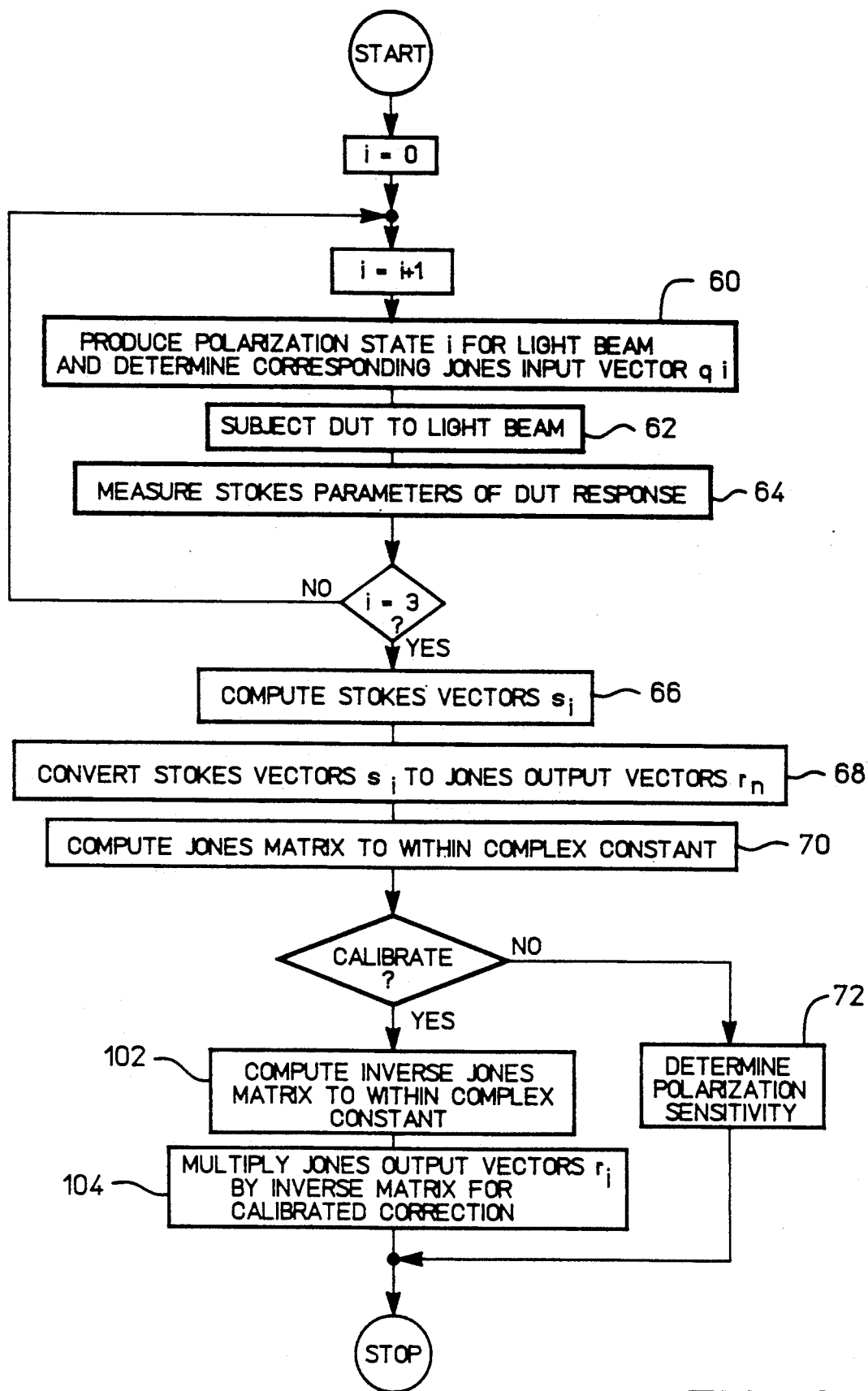
FIG. 3 is a flow chart of one embodiment of the method in accordance with the invention for determining polarization sensitivity of an optical device under test and for calibrating to correct for polarization distortion caused by the optical device under test.

Considered in more detail, one embodiment of the method for determining the polarization sensitivity of the optical DUT 30 is shown in FIG. 3. Polarization sensitivity can be defined to be the ratio of the maximum transmission for any state of polarization to the minimum transmission for any polarization state through the optical DUT 30. Generally, the polarization sensitivity for the case of transmission can be expressed as $t_{max}/t_{min}$.

As indicated above, the one embodiment of the method in accordance with the invention for determining polarization sensitivity of the optical DUT 30 employs Jones calculus. Use of Jones calculus to determine the polarization sensitivity of the optical DUT 30 requires that the light beam 1 fed to the optical DUT be of a known state of polarization. Nevertheless, the optical source 40 can be any source of optical energy, and the beam of light generated by the optical source can have any polarization, including a beam which is not linearly polarized, such as an elliptically polarized beam or an unpolarized beam. This is because the polarization synthesizer 50 assures that the light beam generated by the optical source 40 is of a known polarization state when the light beam 1 exits the polarization synthesizer. If, however, the optical source 40 generates a linearly polarized light beam, selection of the optical source and the sequential settings of the polarization synthesizer 50 must be such that the polarization state of the beam generated by the optical source does not result in complete filtering (i.e., cancellation) of the beam by one of the settings of the polarization synthesizer.

In accordance with the one embodiment of the method of the invention for determining polarization sensitivity of the optical DUT 30, the polarization synthesizer 50 is sequentially set to three predetermined polarization settings so that the light beam 1 fed to the optical DUT has three predetermined polarization states, as indicated by the numeral 60 shown in FIG. 3. For example, the polarization synthesizer 50 can be set to sequentially produce linear polarization states at 0°, 60°, and 120°. Because the polarization states are known, and because these polarization states are linear, three input optical electric field Jones vectors can be specified, as indicated by the step 60 shown in FIG. 3, namely:

$$q_i = \begin{bmatrix} \cos \theta_i \\ \sin \theta_i \end{bmatrix}, \quad (6)$$

where $i = 1, 2, 3$ corresponding to the three sequential settings of the polarization synthesizer 50, and $\theta_i$ is the angle corresponding to the polarization state at the present setting.

The light beam 1 having the three sequential predetermined input states of polarization is fed either through the atmosphere (open beam) or through the optical fiber 51 to the optical DUT 30, as indicated by the numeral 62 shown in FIG. 3. The optical DUT 30 affects the polarization state of the light beam produced by each of the three sequential predetermined settings of the polarization synthesizer 50.

As mentioned above, polarization sensitivity of the optical DUT 30 cannot be accurately determined using Jones calculus if the optical DUT is depolarizing. However, the effects of a depolarizing optical DUT 30 can be eliminated by using an optical source 40 having a very narrow spectral line width, that is, by using an optical source which is quasi-monochromatic with a sufficiently long coherence length.

The polarization sensitivity of the optical DUT 30 can be determined from the three sequential known input electric field Jones vectors given by Equation (6) and the three measured responses of the optical DUT to the three sequential predetermined input states of polarization, as follows. In the case of transmission through the optical DUT 30, the respective polarization states of the light beam 1 produced by the polarization synthesizer 50 sequentially impinge on the optical DUT. The three resulting polarization states of the portion of the light beam $\Delta$l sequentially exit the optical DUT 30 and are fed either open beam or by the optical fiber 52 to the optical polarization meter 10. As indicated by the numeral 64 shown in FIG. 3, the optical polarization meter 10 measures the Stokes parameters, as described earlier, from which the polarization state of each of the three sequential polarization states of the light beam $\Delta$l produced by the optical DUT 30 can be calculated.

The optical polarization meter 10 measures the Stokes parameters of the three sequential polarization states of the light beam $\Delta$l received by the optical polarization meter and computes the corresponding Stokes vectors, as indicated by the numeral 66 shown in FIG. 3. This is accomplished by measuring the signals H, T, C, and F shown in FIG. 2 for each received polarization state of the light beam $\Delta$l. The Stokes vectors for the three sequential predetermined input polarization states are:

$$s_i = \begin{pmatrix} s_{i0} \\ s_{i1} \\ s_{i2} \\ s_{i3} \end{pmatrix} \begin{bmatrix} 1 & 0 & 0 & 0 \\ -1 & 2 & 0 & 0 \\ -1 & 0 & 2 & 0 \\ -1 & 0 & 0 & 2 \end{bmatrix} \begin{pmatrix} H_i \\ T_i \\ C_i \\ F_i \end{pmatrix}, \quad (7)$$

where $i = 1, 2, 3$ and corresponds to the three sequential states of polarization of the light beam $\Delta$l due to the three sequential predetermined settings of the polarization synthesizer 50, the matrix is the instrument matrix of the optical polarization meter 10 specified by the presence of the optical elements 14-17, and H, T, C, and F are the electrical signals produced by the photodetectors 18-21. In practice, the instrument matrix may vary from that shown in Equation (7) as a result of imperfections in the optical elements 14-17 and uneven distribution of the light beam $\Delta$l among the photodetectors 18-21 and, therefore, must be determined.

Jones calculus can be employed to determine the polarization sensitivity of the optical DUT 30 only if relative phase information between the x and y components of the optical electric field are present. The method of the invention for determining polarization sensitivity recognizes that the Stokes vectors $s_i$ contain relative phase information between the x and y components of the optical electric field. Therefore, the Stokes vectors can be converted to output electric field Jones vectors, as indicated by the numeral 68 shown in FIG. 3, as will now be described.

Initially, the degree of polarization given by Equation (5) of each of the three Stokes vectors is set equal to one by changing the measured value of $s_{i0}$ to $s'_{i0}$:

$$s'_{i0} = \sqrt{s_{i1}^2 + s_{i2}^2 + s_{i3}^2}, \quad (8)$$

where $i = 1, 2, 3$. This reduces the effect of noise.

Also, the following normalized Stokes parameters needed for conversion of the Stokes vectors to output electric field Jones vectors are defined:

$$N_{i1} = \frac{s_{i1}}{s'_{i0}}; \quad (9)$$

$$N_{i2} = \frac{s_{i2}}{s'_{i0}};$$

and $$N_{i3} = \frac{s_{i3}}{s'_{i0}}.$$

The output electric field Jones vectors can now be derived from the Stokes vectors for each of the three sequential settings of the polarization synthesizer 50 in accordance with the following conversion expression based on a normalized Stokes vector having unity degree of polarization:

$$r_i = \frac{1}{\sqrt{1 + \beta_i^2}} \begin{pmatrix} 1 \\ \beta_i e^{i\phi_i} \end{pmatrix}, \text{ where } \beta_i = \sqrt{\left(\frac{1 - N_{i1}}{1 + N_{i1}}\right)} \quad (10)$$

and

-continued $$\phi_i = \begin{cases} \tan^{-1}\frac{N_{i3}}{N_{i2}}, & \text{where } N_{i2} > 0 \\ \pi + \tan^{-1}\frac{N_{i3}}{N_{i2}}, & \text{where } N_{i2} < 0 \\ \frac{\pi}{2}, & \text{where } N_{i2} = 0 \text{ and } N_{i3} \geq 0 \\ -\frac{\pi}{2}, & \text{where } N_{i2} = 0 \text{ and } N_{i3} < 0 \end{cases}, i = 1, 2, 3.$$

Now, the Jones matrix of the optical DUT 30 is defined as:

$$M = k \begin{bmatrix} a & b \\ c & 1 \end{bmatrix} = kA, \text{ where } k \text{ is a complex constant.} \quad (11)$$

Therefore, $$r_i = k \begin{bmatrix} a & b \\ c & 1 \end{bmatrix} q_i = kAq_i. \quad (12)$$

A is the Jones matrix M to within a complex constant k. Elements a, b, and c of the matrix A can be computed from the three measured responses represented by Jones output vectors $r_i$ and the three sequential predetermined input polarization states specified by Jones input vectors $q_i$.

Let:

$$r_i = \begin{pmatrix} r_{ix} \\ r_{iy} \end{pmatrix} = k \begin{bmatrix} a & b \\ c & 1 \end{bmatrix} q_i = \quad (13)$$

$$k \begin{bmatrix} a & b \\ c & 1 \end{bmatrix} \begin{pmatrix} q_{ix} \\ q_{iy} \end{pmatrix} = k \begin{bmatrix} aq_{ix} + bq_{iy} \\ cq_{ix} + q_{iy} \end{bmatrix}.$$

The magnitudes and absolute phases of the Jones vectors $r_i$ and $q_i$ are not required for this calculation, so the above expression can be simplified by converting Jones vectors to complex numbers, first by mapping Jones vectors onto the Poincare sphere, and then by mapping the Poincare sphere onto the complex plane. The mapping of Jones vectors and Stokes vectors onto the Poincare sphere is accomplished simply by defining the normalized Stokes parameters given by Equation (9) to be the x, y, and z Cartesian coordinates of points in space. See chapter 1 of Born, M., and Wolf, E., *Principles of Optics*, 6th Edition, Pergamon Press, New York, 1989. This establishes a one-to-one mapping between points on the unit sphere and Jones vectors of unity optical power. The mapping from the Poincare sphere onto the complex plane is a stereographic projection. See, Churchill, R. V., Brown, J. W., and Verhey, R. E., *Complex variables and applications*, 3rd Edition, McGraw-Hill, New York, 1976, page 20.

Suppose the Poincare sphere is centered at the origin of a horizontal complex plane. The sphere can be defined to have a pole located directly above the origin. A point P on the sphere is mapped onto the plane by a line which intersects the pole and the point P on the sphere. The line intersects the complex plane at the point P', and P' is known as the projection of P. When the Poincare sphere is oriented so that the point representing horizontal linear polarization is located at the pole and the point representing +45-degree linear polarization is located at the point (1,0) on the complex plane, the projection P' is given by the ratio $P_x/P_y$ (the ratio of the x and y components of the Jones vector). Writing Equation (13) in terms of the projections $r' = r_x/r_y$ and $q' = q_x/q_y$ yields:

$$r'_i = \frac{aq'_i + b}{cq'_i + 1} = aq'_i + b - cq'_i r'_i. \quad (14)$$

Note that r' and q' are complex scalars, whereas r and q are complex vectors. Consequently, after measuring three responses to three sequential predetermined input states of polarization, a matrix Z can be defined:

$$\begin{pmatrix} r'_1 \\ r'_2 \\ r'_3 \end{pmatrix} = \begin{bmatrix} q'_1 & 1 & -r'_1 q'_1 \\ q'_2 & 1 & -r'_2 q'_2 \\ q'_3 & 1 & -r'_3 q'_3 \end{bmatrix} \begin{pmatrix} a \\ b \\ c \end{pmatrix} = Z \begin{pmatrix} a \\ b \\ c \end{pmatrix}. \quad (15)$$

Hence, $$\begin{pmatrix} a \\ b \\ c \end{pmatrix} = Z^{-1} \begin{pmatrix} r'_1 \\ r'_2 \\ r'_3 \end{pmatrix}. \quad (16)$$

From this last expression, the desired matrix A can be computed, as indicated by the numeral 70 shown in FIG. 3, by measuring $r'_1$, $r'_2$, $r'_3$ and the elements of Z, then by inverting Z and performing the indicated matrix multiplication.

The mathematics can be simplified by selecting a stereographic projection in which the point $q'_i$ on the Poincare sphere is located directly below the origin of the complex plane diametrically opposite the pole of the sphere. In that case, $q'_1 = 0$, and, therefore, $r'_1 = b$ from Equation (14). Consequently, the above three-by-three complex linear system of equations can be reduced to a two-by-two complex system:

$$r'_j = aq'_j + r'_1 - cr'_j q'_j, \text{ where } j = 2, 3. \quad (17)$$

Subtracting $r'_1$ from both sides of Equation (17) and rewriting the equation in matrix form, the following expression is obtained:

$$\begin{pmatrix} r'_2 - r'_1 \\ r'_3 - r'_1 \end{pmatrix} = \begin{bmatrix} q'_2 & -r'_2 q'_2 \\ q'_3 & -r'_3 q'_3 \end{bmatrix} \begin{pmatrix} a \\ c \end{pmatrix} = Y \begin{pmatrix} a \\ c \end{pmatrix}. \quad (18)$$

Therefore, $$\begin{pmatrix} a \\ c \end{pmatrix} = Y^{-1} \begin{pmatrix} r'_2 - r'_1 \\ r'_3 - r'_1 \end{pmatrix}, \text{ and } \det(Y) = q'_2 q'_3 (r'_2 - r'_3). \quad (19)$$

Hence, $b = r'_1$, and a and c can be computed from Equation (19), which specifies the matrix A, as indicated by the step 70 shown in FIG. 3. Y is invertible if det $(Y) \neq 0$, i.e., if $q'_2 \neq 0$ and $q'_3 \neq 0$ and $r'_2 \neq r'_3$. If the matrix A is invertible (i.e., does not represent a perfect polarizer), then $q_i = k^{-1}A^{-1}r_i$, and $r'_2 \neq r'_3$ implies $q'_2 \neq q'_3$. Remembering that $q'_1 = 0$, Y is invertible if the matrix A is invertible and $q'_2$ and $q'_3$ differ from $q'_1$ and differ from each other.

Also, considering that measurements are performed in the presence of noise and small systematic errors, the most accurate calculation of the matrix A will result when the three sequential predetermined input states of polarization are as far as possible apart from one another on the Poincare sphere. This leads to the following preferred selection of the three sequential input states of polarization.

Since it is easier to generate linear states of polarization at any wavelength than it is to generate elliptical polarization states, the input states of polarization are preferably generated by successively inserting three linear polarizers into a light beam which is approximately unpolarized or approximately circularly polarized. This constrains the powers of the three sequential input states of polarization to be roughly equal and yields most accurate measurement. Accordingly, the linear polarizers 50a, 50b, and 50c at relative angles 0°, 60°, and 120° are preferably selected so that the three sequential predetermined input states of polarization specified by the Jones input vectors $q_i$ will be located at 120° intervals on a great circle on the Poincare sphere, i.e., as far apart as possible.

A few techniques from linear algebra needed to understand the determination of polarization sensitivity of the optical DUT 30 from the matrix A in accordance with one embodiment of the method of the invention will now be briefly described. Notation follows that of Lancaster, P., and Tismenetsky, M., *The theory of matrices*, 2nd Edition, Academic Press, San Diego, 1985.

A standard inner product $(x, y) = y^* x$ can be defined to associate a scalar with any pair of complex vectors x and y. ($y^*$ denotes the conjugate transpose of y, and $\bar{c}$ denotes the complex conjugate of a complex scalar c.) The intensity of an optical electric field represented by a Jones vector x is proportional to the inner product (x, x), as is mentioned in Wanser, K. H., and Sabar, N. H., "Remote polarization control for fiber-optic interferometers," *Optics Lett.*, 12, 1987, pages 217–219.

Additionally, the field of values of a matrix L is defined as the set of complex numbers (Lx, x), where x ranges over all vectors that are normalized so that (x, x) = $x^* x = 1$. It can be shown that the field of values of a Hermitian matrix is an interval of the real line, and that the eigenvalues of a Hermitian matrix are real. Furthermore, the maximum and minimum of the field of values of a two-by-two Hermitian matrix with eigenvalues $\lambda_1$ and $\lambda_2$, with $\lambda_1 \leq \lambda_2$, are given by those eigenvalues, i.e., the minimum for the field of values is $\lambda_1$ and the maximum is $\lambda_2$.

Furthermore, the matrix product $B^* B$ is positive semi-definite, so the square root of the product $(B^* B)^{\frac{1}{2}}$ exists. The singular values $\sigma_i$ of B are the eigenvalues of this square root, i.e., $\sigma_i(B) = \lambda_i((B^* B)^{\frac{1}{2}})$. Singular values are non-negative real numbers. It can be shown that $\sigma_i^2(B) = \lambda_i(B^* B)$, and that the singular values of a square matrix are invariant under unitary transformation, i.e., for any square matrix B and any two unitary matrices C and D, $\sigma_i(B) = \sigma_i(CBD)$.

Now, to determine polarization sensitivity of the optical DUT 30, it is desired to find maximum and minimum intensity transmission coefficients $t_{max}$ and $t_{min}$ through the optical DUT over the range of all possible states of polarization. The input optical electric field to the optical DUT 30 is given by the Jones input vector q, the output optical electric field is Aq, so the problem is reduced to finding the maximum and minimum values of (Aq, Aq) over all inputs q of a constant intensity (q, q). Using linear algebra, it can be shown that (Aq, Aq) = (Pq, q), where $P = A^* A$ is Hermitian. Finding the maximum and minimum intensity transmission coefficients is therefore equivalent to finding the maximum and minimum of the field of values of P, which are given by $\lambda_1(P)$ and $\lambda_2(P)$, which are the eigenvalues of P. Consequently, having determined the matrix A at the step 70 shown in FIG. 3, the polarization sensitivity (or dependence) of the power transmission through the optical DUT 30 can be determined, as indicated by the numeral 72 shown in FIG. 3, as follows.

The expression for polarization sensitivity obtained in terms of the singular values of the matrix A for global variation in power transmission through the optical DUT 30 is given by:

$$\frac{t_{max}}{t_{min}} = \frac{\sigma_2^2(A)}{\sigma_1^2(A)}, \tag{20}$$

where $\sigma_1(A)$ and $\sigma_2(A)$ are the singular values of A. $\sigma_i^2(A) = \lambda_i(A^* A)$, where i = 1,2. $\lambda_i(A^* A)$ are the eigenvalues of $A^* A$, and $A^*$ is the conjugate transpose of A. This leads to the following expression for the determination of polarization sensitivity:

$$\frac{t_{max}}{t_{min}} = \frac{f + h + \sqrt{(f+h)^2 + 4(g-fh)}}{f + h - \sqrt{(f+h)^2 + 4(g-fh)}}, \tag{21}$$

where $f = |a|^2 + |c|^2$ $g = |a|^2|b|^2 + |c|^2 + d$ $h = 1 + |b|^2$ and $d = 2\text{Re}[\bar{a}bc]$, where $\bar{a}$ is the complex conjugate of a. When the three sequential predetermined input states of polarization are at the relative angles 0°, 60°, and 120°, the projected stimuli are $q'_1 = 0$, $(b = r'_1)$, $q'_2 = \tan 60° = \sqrt{3}$, and $q'_3 = \tan 120° = -\sqrt{3}$.

If optical fibers are present, such as the optical fibers 51 and 52, then the responses of these fibers are included in the responses of the optical DUT 30. However, the polarization dependence of the transmission loss of a single-mode optical fiber is small enough that it typically cannot be measured, and this leads to a Jones matrix which is unitary. See, Wanser, K. H., and Sabar, N. H.; "Remote polarization control for fiber-optic interferometers," *Optics Lett*, 12, 1987, pages 217–219, and Poole, C. D., and Wagner, R. E., "Phenomenological approach to polarisation dispersion in long single-mode fibers," *Elec. Lett.*, 22, 1986, pages 1029–1030. The optical fibers 51 and 52 connected to the input and output of the optical DUT 30, respectively, are therefore labeled with the unitary Jones matrices U and V, respectively, as shown in FIG. 1, and the transmission matrix of the optical DUT with optical fiber connections is therefore VAU.

The polarization sensitivity of the optical DUT 30 given by Equation (20) is in relative terms $t_{max}/t_{min}$, since the polarization sensitivity determination is based on the matrix $A = k^{-1}M$, where M is the actual Jones matrix for the optical device. The value of the complex constant k can be found so that the absolute power transmission loss or gain can be determined, as follows.

The above-described polarization sensitivity determination yields a ratio in terms of the variation in power loss or gain through the optical DUT 30 over all states of polarization. By adding a through calibration, a range of absolute loss or gain can be determined.

Figure 4A:
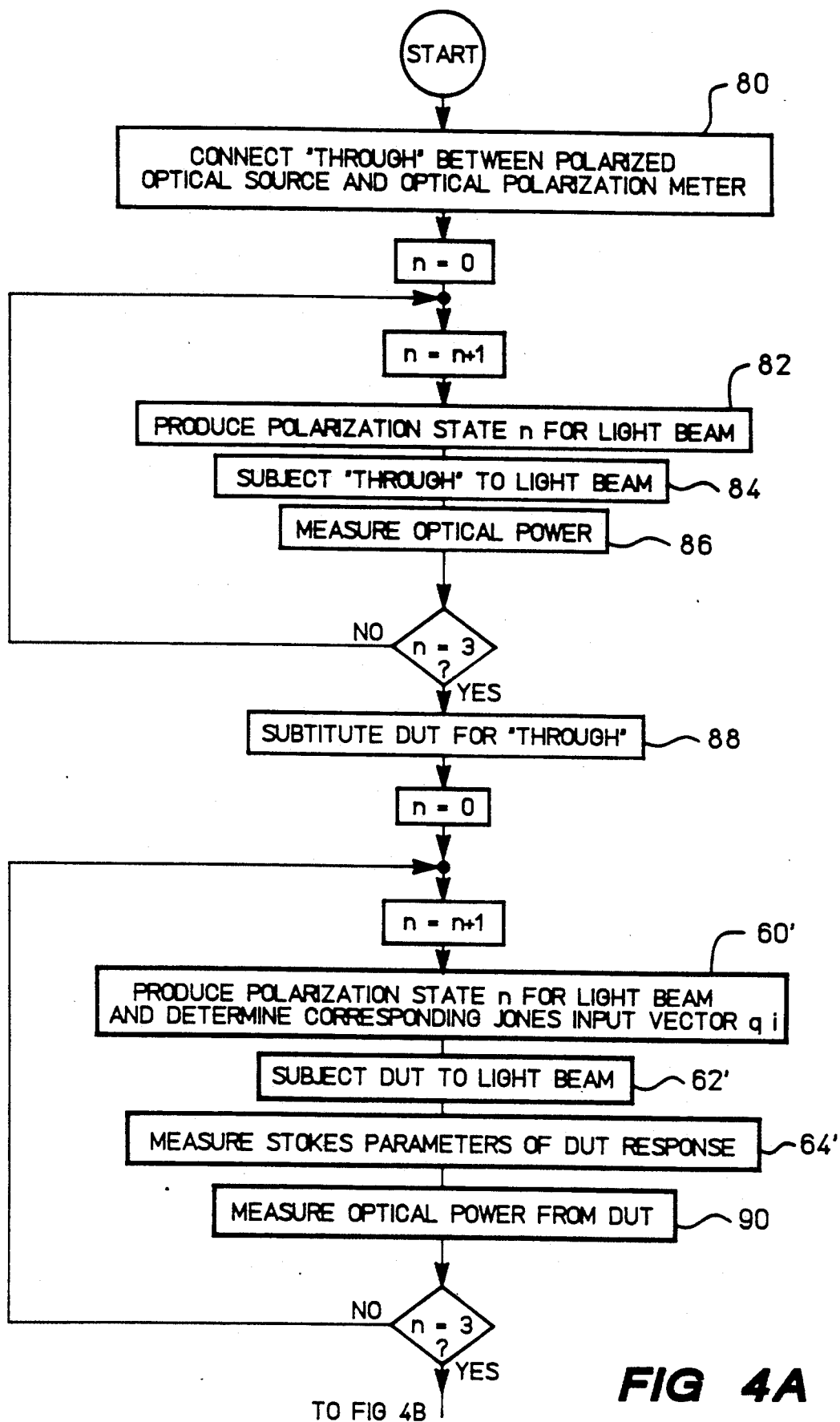
FIGS. 4A and 4B are a flow chart of one embodiment of a method in accordance with the invention for determining absolute polarization sensitivity and for absolutely calibrating to correct for polarization distortion of any input optical network which is not completely polarizing.
Figure 4B:
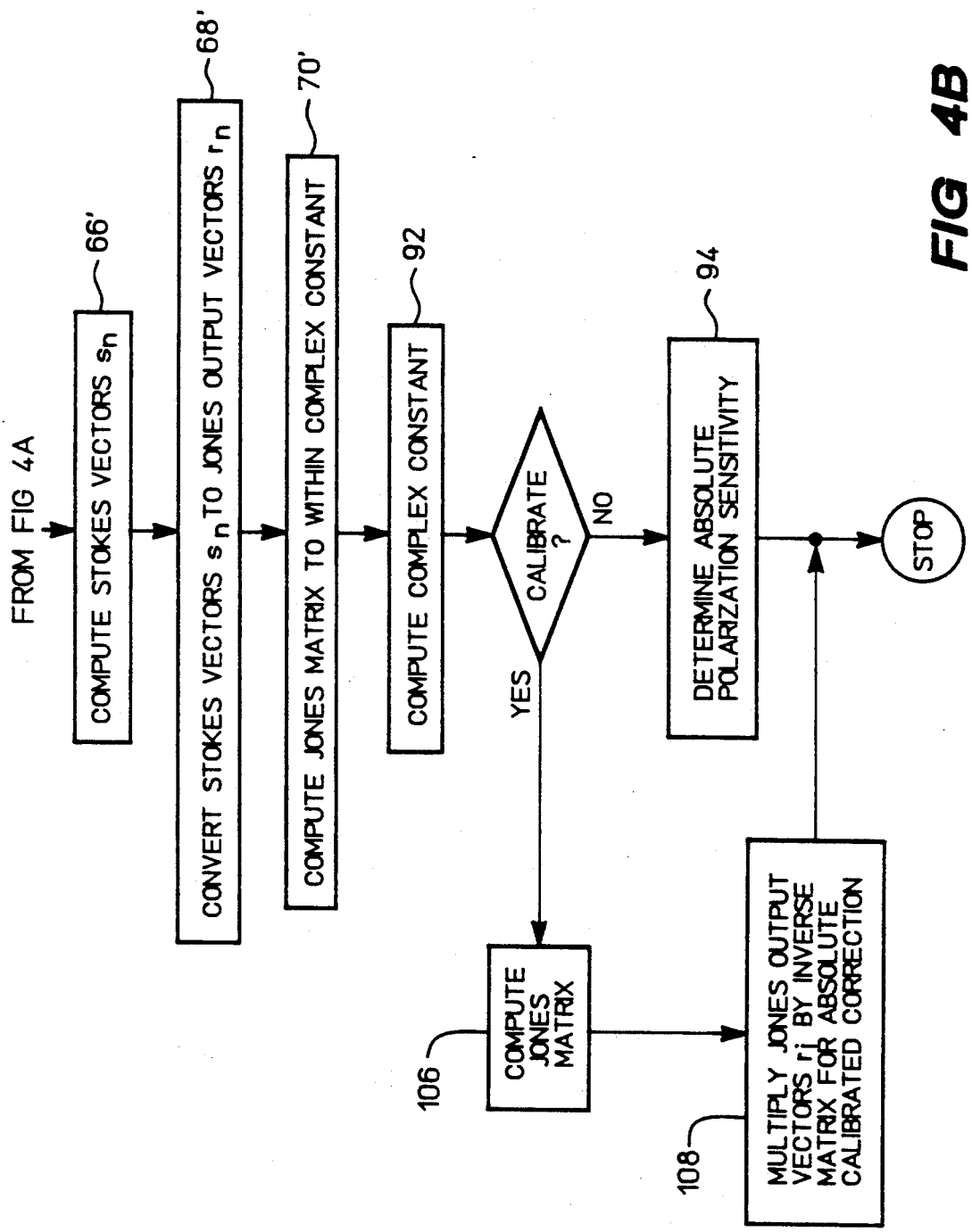

Initially, a through (single-mode optical fiber in the fiber-coupled case or the atmosphere in the open-beam case), which is assumed to have negligible loss, is connected between the polarized optical source 9 and the optical polarization meter 10 instead of the optical DUT 30, as indicated by the numeral 80 shown in FIG. 4. Then, the optical power $I_{Fn}$ transmitted by the through to the optical polarization meter 10 is measured as the polarization synthesizer 50 produces the three sequential predetermined input states of polarization (n=1, 2, 3), as indicated by the numerals 82, 84, and 86 shown in FIG. 4. This completes the through calibration.

The optical DUT 30 is then substituted for the through, as indicated by the numeral 88 shown in FIG. 4. Next, the steps 60, 62, and 64 described in connection with FIG. 3 are performed, as indicated by the primed numerals 60', 62', and 64' shown in FIG. 4. Additionally, the optical power $I_{Dn}$ is measured for each of the same three sequential predetermined input states of polarization (n=1, 2, 3), as indicated by the numeral 90 shown in FIG. 4. Thereafter, the steps 66, 68, and 70 described in connection with FIG. 3 are performed, as indicated by the primed numerals 66', 68', and 70' shown in FIG. 4. This results in three optical power measurements for the through, three optical power measurements for the optical DUT 30, and the matrix A.

Since the through has negligible loss (i.e., a unitary Jones matrix), from Equation (12):

$$\frac{I_{Dn}}{I_{Fn}} = \frac{|r_n|^2}{|q_n|^2} = \frac{|kAq_n|^2}{|q_n|^2} = |k|_n^2 \frac{|Aq_n|^2}{|q_n|^2}. \quad (22)$$

$q_n$ is related to its projection $q'_n$ by:

$$q_n = \sqrt{\frac{|q_n|^2}{1+|q'_n|^2}} \begin{pmatrix} q'_n \\ 1 \end{pmatrix}. \quad (23)$$

Consequently, $$|Aq_n|^2 = (Aq_n, Aq_n) = q_n^* A^* A q_n = \quad (24)$$

$$\frac{|q_n|^2}{1+|q'_n|^2}(q'_n{}^* \; 1)A^*A\begin{pmatrix} q'_n \\ 1 \end{pmatrix},$$

so:

$$|k|_n^2 = \frac{I_{Dn}}{I_{Fn}} \frac{|q_n|^2}{|Aq_n|^2} = \frac{I_{Dn}}{I_{Fn}} \frac{1+|q'_n|^2}{(q'_n{}^* \; 1)A^*A\begin{pmatrix} q'_n \\ 1 \end{pmatrix}}, \quad (25)$$

from which the complex constant k can be computed, as indicated by the numeral 92 shown in FIG. 4.

Three values of $|k|_n^2$ will be computed (n=1, 2, 3). All three should be equal, but in the presence of errors and noise, a mean value $|k|_{mean}^2 = \frac{1}{3}(|k|_1^2 + |k|_2^2 + |k|_3^2)$ is preferably used for $|k|_n^2$.

Now, the maximum and minimum transmission through the optical DUT 30 will occur at the states of polarization given by the eigenvectors $e_1$ and $e_2$ of $A^*A$ or $M^*M$, since the eigenvectors of these matrix products are identical. If two input states of polarization are deemed to be the unit amplitude eigenvectors, the responses of the optical DUT 30 will be $r_1 = kAe_1$ and $r_2 = kAe_2$, where k is equal to the square root of $|k|_{mean}^2$. Hence, $$T_{min} = \frac{|r_1|^2}{|e_1|^2} = \frac{|k|^2 e_1^* A^* A e_1}{1} = |k|^2 e_1^* \lambda_1 e_1 = \lambda_1 |k|^2 \quad (26)$$

and $$T_{max} = \frac{|r_2|^2}{|e_2|^2} = \frac{|k|^2 e_2^* A^* A e_2}{1} = |k|^2 e_2^* \lambda_2 e_2 = \lambda_2 |k|^2,$$

where $\lambda_1 \leq \lambda_2$.

Here $\lambda_1$ and $\lambda_2$ are the eigenvalues of $A^*A$, that is, $\lambda_m e_m = A^* A e_m$ for m=1, 2. Therefore, as indicated by the numeral 94 shown in FIG. 4, the absolute range of power loss or gain is given by:

$$T_{min} = \lambda_1 |k|^2 \text{ and } T_{max} = \lambda_2 |k|^2. \quad (27)$$

Similarly, polarization sensitivity can be defined in the case of reflection to be the ratio of the maximum reflection for any polarization state to the minimum reflection for any state of polarization from the optical DUT 30. The polarization sensitivity for the case of reflection can be generally expressed in relative terms as $r_{max}/r_{min}$ or in absolute terms as $R_{min}$ and $R_{max}$.

Figure 5:
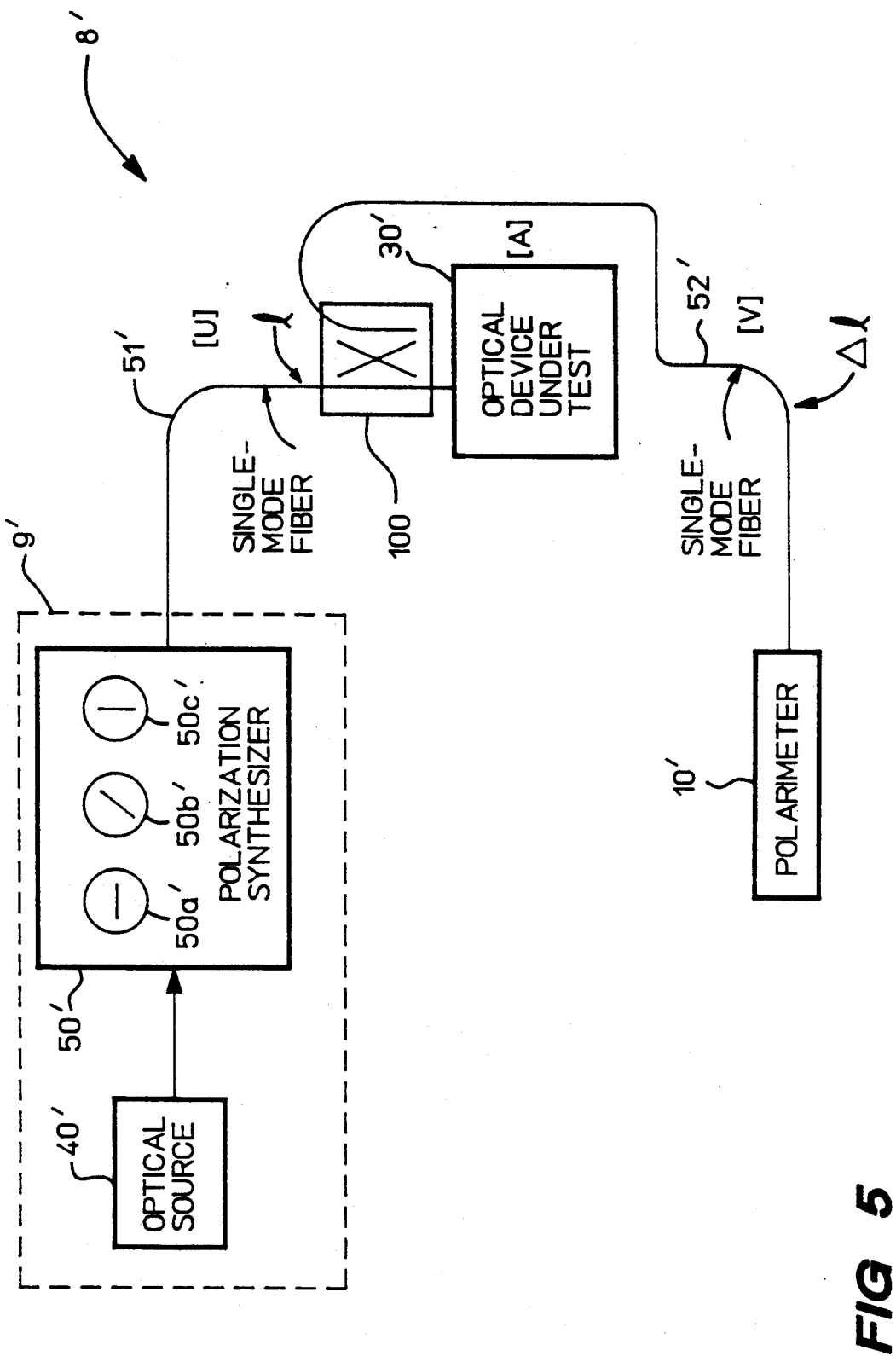
FIG. 5 is a schematic diagram similar to FIG. 1, in which the instrument is configured for determining the polarization sensitivity of an optical device under test in accordance with the invention based on reflection measurements.

$r_{max}/r_{min}$ and $R_{min}$ and $R_{max}$ can be determined analogously to $t_{max}/t_{min}$ and $T_{min}$ and $T_{max}$, respectively, based on reflection measurements instead of transmission measurements using the instrument shown in FIG. 5. Elements 9', 10', 30', 51', and 52' shown in FIG. 5 correspond to the elements 9, 10, 30, 51, and 52, respectively, shown in FIG. 1. The only difference is that the light beam 1 is fed to the optical DUT 30' by a directional optical coupler 100, and the portion of the beam $\Delta l$ fed to the optical polarization meter 10' is a reflected beam, rather than a beam transmitted by the optical DUT 30 to the optical polarization meter 10, as shown in FIG. 1. Consequently, both transmission and reflection measurements are considered to be within the scope of the method for determining polarization sensitivity in accordance with the invention.

In summary, the polarization sensitive of the optical DUT 30 or 30' can be determined in relative terms, as shown in FIG. 3, or in absolute terms, as shown in FIG. 4. In each case, the matrix A is determined. Since the matrix A can be determined, the principles of the method in accordance with the invention can be generalized to correct for the distortion of the polarization state caused by any optical network which is not completely polarizing, such as the optical DUT 30 or 30', by determining the matrix A of the optical network using the three sequential predetermined input states of polarization and multiplying responses during subsequent measurements through the optical network represented by Jones output vectors by the inverse of the matrix A.

Additionally, in the case of the method shown in FIG. 4, this calibration is in absolute terms.

Considered in more detail, the optical network to be calibrated out is considered to be the optical DUT for the purposes of the processes shown in FIGS. 3 and 4. Then, rather than proceed to determination of the relative polarization sensitivity at the step 72 shown in FIG. 3 or the absolute polarization sensitivity at the step 94 shown in FIG. 4, the method in accordance with the invention performs a calibration, as follows.

One embodiment of the method in accordance with the invention also provides calibration of the instrument shown in FIGS. 1 and 5 to correct for the distortion of the polarization state caused by any optical network, which is not completely polarizing, in the input path of the optical polarization meter 10, using no more than three reference light beam sources of known polarization. Preferably, the three sequential predetermined input states of polarization are fed to the optical network which is desired to be calibrated out of the optical path between the polarized optical source 9 or 9' and the polarization meter 10 or 10' to determine the elements a', b', and c' of a matrix A' by the procedures described above in connection with FIGS. 3 and 4 for determining the matrix A for an optical device under test. That is, the optical network to be calibrated out is effectively considered to be an optical device under test for the purposes of the preceding description insofar as determining the matrix A is concerned. Therefore, the matrix A' from a defined calibration reference frame (for example, the plane of the input to the optical polarization meter 10) is then:

$$A' = \begin{bmatrix} a' & b' \\ c' & 1 \end{bmatrix}, \quad (28)$$

as indicated by the numeral 102 shown in FIG. 3. Then, any Jones output vector r measured using the optical polarization meter 10 can be transformed to the defined calibration reference frame by multiplying the total response r by the inverse of A' (i.e., $A'^{-1}$), as indicated by the numeral 104 shown in FIG. 3. Similarly, the Jones matrix M' from a defined calibration reference frame is $$M' = k'A' = k' \begin{bmatrix} a' & b' \\ c' & 1 \end{bmatrix}, \quad (29)$$

as indicated by the numeral 106 shown in FIG. 4. Then, any Jones output vector r measured using the optical polarization meter 10 can be transformed to the defined calibration reference frame by multiplying the total response r by the inverse of M' (i.e., $M'^{-1}$), as indicated by the numeral 108 shown in FIG. 4. If the calibrated Jones output vector is $v_{cal}$, then $v_{cal} = M'^{-1}v$.

Also, any measured Stokes vector s can be transformed to a calibrated Stokes vector $s_{cal}$ by multiplying by $M_1$, the Mueller matrix equivalent of $M'^{-1}$, i.e., $s_{cal} = M_1 s$. $M_1$ can be derived from $M'^{-1}$ in accordance with the procedure described in Hauge, P. S., et al., *Surface Science*, 96, 1980, pages 101–107.

If the optical network or optical DUT to be calibrated out is completely polarizing (behaves as a perfect polarizer), its Jones matrix M' will be singular, as will be the Mueller matrix equivalent. Such an optical network or optical DUT cannot be calibrated out, since the inverse of a singular matrix does not exist.

Finally, beam alignment and positioning problems inherent in the apparatuses disclosed in U.S. Pat. No. 4,681,450 and 4,158,506 are solved in accordance with one embodiment of the method in accordance with the invention by using the input optical fiber 11 to introduce the light beam Δl into the optical polarization meter 10. Such an optical fiber acts as a spatial filter, so that the direction and distribution of the incoming light beam Δl is highly repeatable. However, it is known that such optical fibers may become birefringent under mechanical strain, such as bending, and thereby affect the state of polarization of the incident light beam and the accuracy of polarization measurements. Therefore, a calibration is also preferably performed to correct for any polarization effects induced by the input optical fiber 11, as follows.

The polarization transformation induced by the input optical fiber 11 can be expressed as a real four-by-four Mueller matrix denoted by the symbol [M]. A short length of fiber has negligible loss and will not change the degree of polarization of the light beam Δl, and, hence, the matrix [M] can be written in terms of an orthogonal three-by-three sub-matrix [T] as follows:

$$[M] = \begin{bmatrix} 1 & 0 & 0 & 0 \\ 0 & & & \\ 0 & & [T] & \\ 0 & & & \end{bmatrix} \quad (30)$$

The portion of the light beam Δl described by the Stokes vector [p], where [p] is a column matrix, will be transformed into an output beam of polarization [p'] by the input optical fiber 11. The transformation can be written as a matrix product:

$$[p'] = [M][p] \quad (31)$$

Knowledge of all the elements of the matrix [M] will determine the correction to be performed. The matrices [M] and [T] have inverses denoted by $[M^{-1}]$ and $[T^{-1}]$, respectively. It can be shown that:

$$[M^{-1}] = \begin{bmatrix} 1 & 0 & 0 & 0 \\ 0 & & & \\ 0 & & [T^{-1}] & \\ 0 & & & \end{bmatrix} \quad (32)$$

Figure 6:
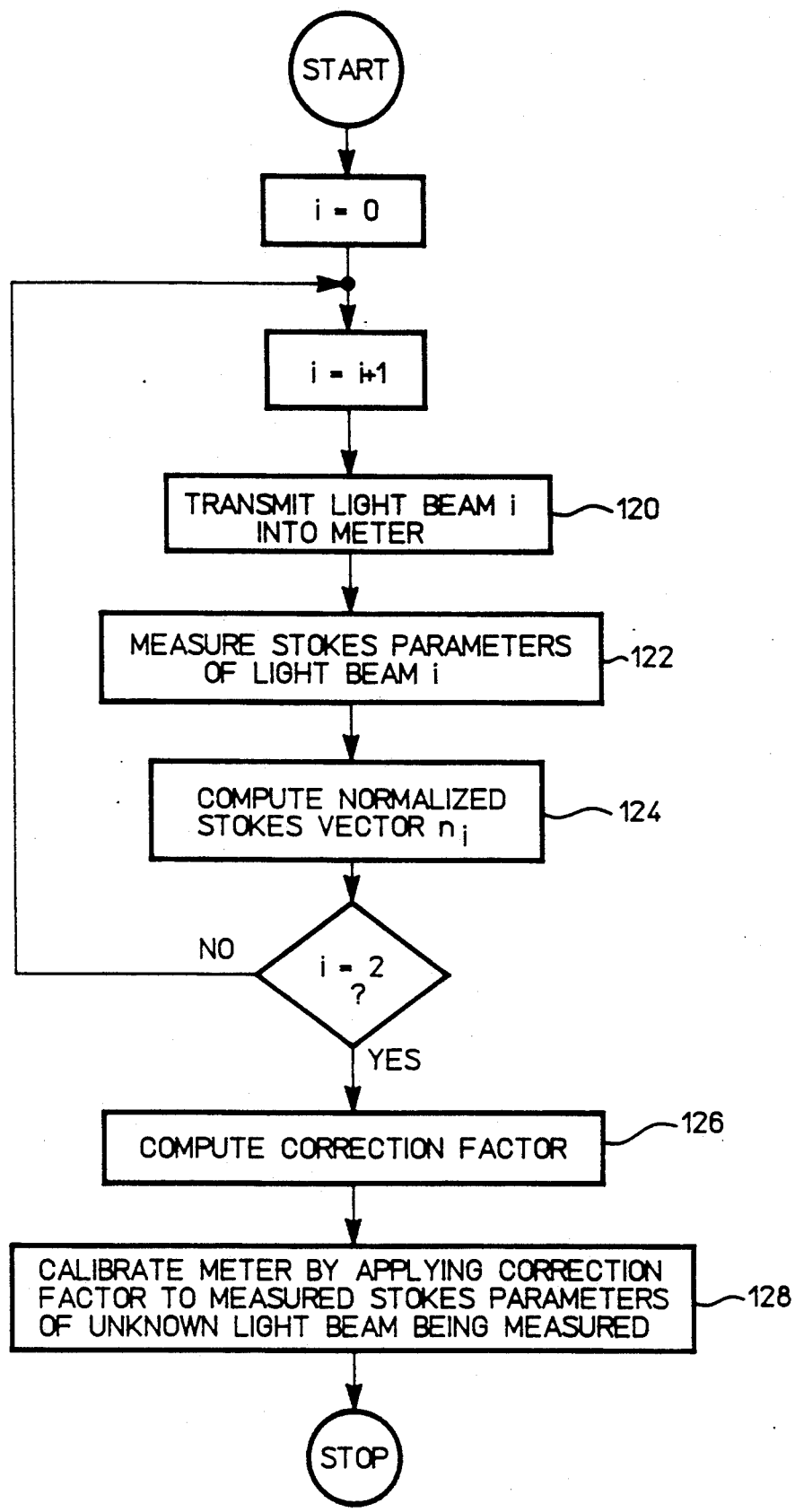
FIG. 6 is a flow chart of one embodiment of a method in accordance with the invention for calibration to correct for polarization distortion of the input optical fiber incorporated into the optical polarization meter shown in FIG. 2.

One embodiment of the method in accordance with the invention for correcting the distortion of the polarization state caused by the input optical fiber 11 determines the matrix [T], and, therefore, the matrix [M], by successively introducing two different light beams of linearly polarized light and measuring the resulting two polarization states at the output of the input optical fiber 11 using the optical polarization meter 10, as indicated by the numerals 120 and 122 shown in FIG. 6. The polarization direction of these two input light beams are preferably at an angle of 45° relative to each other, although any relative angle between, but not including, 0° and 90° can be used, including two of the three sequential predetermined input polarization states described earlier. As indicated by the numeral 124 shown in FIG. 6, a three-element normalized Stokes vector n can be derived from a full four-element Stokes vector s by dividing the second, third, and fourth elements of the Stokes vector by the first element:

$$n = \begin{bmatrix} \frac{s_1}{s_0} \\ \frac{s_2}{s_0} \\ \frac{s_3}{s_0} \end{bmatrix}. \quad (33)$$

If it is assumed that the first light beam is horizontally polarized, then the resulting polarization state emerging from the input optical fiber 11 can be denoted by the normalized Stokes vector h. The polarization resulting from the second light beam can be denoted by the normalized Stokes vector f. Three orthonormal vectors x, y, and z are then formed as follows:

$$x = \frac{h}{|h|} \quad (34)$$

$$z = \frac{h \times f}{|h \times f|}$$

$$y = x \times z$$

Any two reference light beams can be used to determine [T], as long as they correspond to Stokes vectors h and f that have a non-zero cross product h×f, which is true for all relative angles between their direction of polarization except for 0° and 90°.

The elements of x, y, and z are the columns of the desired matrix [T]:

$$[T] = \begin{bmatrix} x_1 & y_1 & z_1 \\ x_2 & y_2 & z_2 \\ x_3 & y_3 & z_3 \end{bmatrix}. \quad (35)$$

The desired state of polarization at the input of the input optical fiber 11 is obtained by forming the inverse of the matrix [T] and substituting the inverse (i.e., [T$^{-1}$]) into the matrix [M$^{-1}$] in Equation (32), as indicated by the numeral 126 shown in FIG. 6. The inverse Mueller matrix [M$^{-1}$] is then used to multiply the measured state of polarization at the output of the input optical fiber 11 to correct for its distortion of the polarization state of the light beam Δl:

$$[p] = [M^{-1}][p'], \quad (36)$$

as indicated by the numeral 128 shown in FIG. 6.

The computation of this calibration correction of the optical polarization meter 10 at different wavelengths can be performed by the microprocessor 27 shown in FIG. 2. A similar calibration can be carried out not only for optical fibers, but for any birefringent medium which transforms the state of polarization without substantially changing the degree of polarization.

By using both the calibration indicated by the steps 106 and 108 shown in FIG. 4 and calibration shown in FIG. 6, an absolutely defined calibration frame of reference is established. That is, the calibration corrects for all distortion of the state of polarization downstream from the polarized optical source 9 or 9'.

The foregoing description is offered primarily for purposes of illustration. While a variety of embodiments of a method and apparatus for measuring polarization sensitivity of an optical device under test and associated calibrations have been disclosed, it will be readily apparent to those skilled in the art that numerous other modifications and variations not mentioned above can still be made without departing from the spirit and scope of the invention as claimed below. For example, the focusing concave mirror 12 shown in FIG. 2 can be replaced by a beam splitter and associated collimating and focusing lenses. Furthermore, measurement of reflection characteristics can be performed by employing a beam splitter instead of the directional optical coupler 100 shown in FIG. 5. Accordingly, the scope of the invention can only be ascertained by reference to the appended claims.

What is claimed is:

1. A method for calibrating an optical polarization meter to compensate for any polarization distortion caused by optical elements, which polarization distortion leads to transmission loss that is independent of polarization, the method comprising the steps of:

transmitting a first incident polarized light beam from a polarized optical source through the optical elements to the meter;

measuring a set of Stokes parameters of the first incident beam;

computing a first normalized Stokes vector according to the Stokes parameters of the first incident beam;

transmitting a second incident polarized light beam from the polarized optical source through the optical elements to the meter, the second incident beam having a polarization different from that of the first incident beam;

measuring a set of Stokes parameters of the second incident beam;

computing a second normalized Stokes vector according to the Stokes parameters of the second incident beam;

computing a set of calibration factors according to the normalized Stokes vectors; and correcting polarization parameters of an unknown light beam as measured by the meter according to the calibration factors to provide a calibrated polarization measurement.

2. A method according to claim 1 wherein the optical elements comprise an optical spatial filter of the optical polarization meter.

3. A method according to claim 1 wherein computing the calibration factors comprises:

computing a first calibration vector by scaling each element of the first normalized Stokes vector by the magnitude of the first normalized Stokes vector;

computing a second calibration vector by scaling each element of the second normalized Stokes vector by the magnitude of the second normalized Stokes vector; and computing a third calibration vector by taking the vector cross product of the second calibration vector and the first calibration vector and then scaling each element of the third calibration vector by the magnitude of the third calibration vector.

4. A method according to claim 3 wherein computing the calibration factors comprises:

forming a first matrix having three columns each comprising elements that are equal to elements of one of the calibration vectors;

forming a second matrix which includes the first matrix; and taking the inverse of the second matrix to obtain the calibration factors.

5. A method according to claim 1 wherein the first and second incident polarized light beams are linearly polarized and the relative angle between the direction of polarization of the first incident polarized light beam and the second incident polarized light beam is 45 degrees.

6. An instrument for measuring polarization sensitivity of an optical network, the instrument comprising:

polarized optical source means that sequentially generates three predetermined states of polarization of a light beam and impinges the light beam having each of the three predetermined polarization states onto the optical network;

optical polarization measurement means that receives a portion of each of the three predetermined polarization states of the light beam that is one of a) transmitted by and b) reflected from the optical network and measures the polarization states produced by the effect of the optical network on each of the three predetermined polarization states of the beam; and means for computing a ratio of maximum and minimum values from the measured polarization states produced by the effect of the optical network on each of the three predetermined polarization states of the beam to thereby provide a measurement of the polarization sensitivity of the optical network.

7. The instrument as in claim 6 wherein the polarized optical source means comprises an optical source for generating a beam light, the optical source having an output, and a polarization synthesizer having an input connected to the output of the optical source, the polarization synthesizer comprising optical elements for producing the three predetermined states of polarization of the light beam in response to the beam of light received from the optical source.

8. The instrument as in claim 7 wherein the optical elements of the polarization synthesizer comprise a zero-degree linear polarizer, a 60-degree linear polarizer, and a 120-degree linear polarizer sequentially inserted into a path of the beam of light received from the optical source.

9. An instrument for measuring polarization sensitivity of an optical network, the instrument comprising:

polarized optical source means that sequentially generates three predetermined states of polarization of a light beam and impinges the light beam having each of the three predetermined polarization states onto the optical network;

optical polarization measurement means that receives a portion of each of the three predetermined polarization states of the light beam that is one of a) transmitted by and b) reflected from the optical network and measures the polarization states produced by the effect of the optical network on each of the three predetermined polarization states of the beam, the optical polarization measurement means comprising:

an optical spatial filter which receives and filters each of the three predetermined polarization states of the portion of the light beam from the optical network;

means for splitting the filtered portion of the light beam into four partial beams;

a first optical element located in the path of a first one of the partial beams and imparting a first polarization thereto;

a second optical element located in the path of a second one of the partial beams and imparting a second polarization thereto;

a third optical element located in the path of a third one of the partial beams and imparting a third polarization thereto;

four photodetectors, each photodetector receiving a different one of the four partial beams and providing a signal indicative of the intensity of that partial beam; and means for computing the polarization of the incident beam of light from the signals provided by the photodetectors; and means for computing a ratio of maximum and minimum values from the measured polarization states produced by the effect of the optical network on each of the three predetermined polarization states of the beam to thereby provide a measurement of the polarization sensitivity of the optical network.

10. The instrument as in claim 9 wherein the polarized optical source means comprises an optical source for generating a beam of light, the optical source having an output, and a polarization synthesizer having an input connected to the output of the optical source, the polarization synthesizer comprising optical elements for producing the three predetermined states of polarization of the light beam in response to the beam of light received from the optical source.

11. The instrument as in claim 10 wherein the optical elements of the polarization synthesizer comprise a zero-degree linear polarizer, a 60-degree linear polarizer, and a 120-degree linear polarizer sequentially inserted into a path of the beam of light received from the optical source.

12. A method for measuring the polarization sensitivity of an optical device under test based on one of a) transmission and b) reflection responses of said optical device under test, the method comprising:

producing a polarized light beam having three sequential predetermined states of polarization, corresponding to three input optical electric field Jones vectors;

impinging the light beam on the optical device under test;

measuring one of the a) transmission and b) reflection responses of the optical device under test to the light beam for each of the three sequential predetermined polarization states by measuring the Stokes parameters of the responses of the optical device under test;

computing Stokes vectors from the Stokes parameters;

converting the Stokes vectors to output optical electric field Jones vectors;

computing a Jones matrix to within a complex constant for the optical device under test from the Jones input and output vectors; and computing a ratio of the maximum and minimum values of the one of the a) transmission and b) reflection responses to provide a measurement of the polarization sensitivity of the optical device under test in relative terms from the matrix.

13. A method according to claim 12, further comprising the step of computing states of polarization corresponding to the at least one of the maximum and minimum values of the one of the a) transmission and b) reflection responses of the optical device under test.

14. A method for calibrating an instrument to correct for distortion of polarization state caused by an optical network which is not completely polarizing, comprising the steps of:
- producing a polarized light beam having three sequential predetermined states of polarization, corresponding to three input optical electric field Jones vectors;
- impinging the light beam on the optical network;
- measuring one of the a) transmission and b) reflection responses of the optical network to the light beam for each of the three sequential predetermined polarization states by measuring the Stokes parameters of the responses of the optical network;
- computing Stokes vectors from the Stokes parameters for the optical network;
- converting the Stokes vectors correlated to the responses of the optical network to output optical electric field Jones vectors;
- computing a Jones matrix to within a complex constant for the optical network from the Jones input and output vectors;
- computing the inverse of the matrix for the optical network; and
- correcting parameters of an unknown light beam as measured by the instrument according to the inverse of the matrix for the optical network to provide a calibrated measurement of said parameters whereby said parameters are correctly measured notwithstanding any distortion of the state of polarization caused by the optical network.

15. A method according to claim 14, further comprising the steps of:
- inserting an optical device under test into the path of the light beam;
- measuring one of the a) transmission and b) reflection responses of the optical network and the optical device under test to the light beam for each of the three sequential predetermined polarization states by measuring the Stokes parameters of the responses of the optical network and the optical device under test;
- computing second Stokes vectors from the Stokes parameters for the optical network and the optical device under test;
- converting the second Stokes vectors correlated to the responses of the optical network and the optical device under test to second output optical electric field Jones vectors;
- computing a Jones matrix to within a complex constant for the optical device under test from the Jones input vectors and second Jones output vectors after multiplication of the second Jones output vectors by the inverse of the matrix for the optical network; and
- computing a ratio of maximum and minimum values of the one of a) transmission and b) reflection responses of the optical device under test to provide a measurement of the polarization sensitivity of the optical device under test in relative terms from the matrix for the optical device under test.

16. A method according to claim 15, further comprising the step of computing states of polarization corresponding to the at least one of the maximum and minimum values of the one of the a) transmission and b) reflection responses of the optical device under test.

17. A method for measuring the polarization sensitivity of an optical device under test based on one of a) transmission and b) reflection responses of the optical device under test, the method comprising the steps of:
- producing a polarized light beam having three sequential predetermined states of polarization, corresponding to three input optical electric field Jones vectors;
- impinging the light beam on an optical through;
- measuring one of the a) transmitted and b) reflected power of the optical through to the light beam for at least one of the three sequential predetermined polarization states;
- substituting the optical device under test for the optical through;
- impinging the light beam on the optical device under test;
- measuring one of the a) transmission and b) reflection responses of the optical device under test to the light beam for each of the three sequential predetermined polarization states by measuring the Stokes parameters of the responses of the optical device under test;
- measuring one of the a) transmitted and b) reflected power of the optical device under test to the light beam for at least one of the three sequential predetermined polarization states;
- computing Stokes vectors from the Stokes parameters for the optical device under test;
- converting the Stokes vectors correlated to the responses of the optical device under test to output optical electric field Jones vectors;
- computing a Jones matrix for the optical device under test from the Jones input and output vectors and the power measurements obtained with the optical through and the optical device under test; and
- providing a measurement of the polarization sensitivity of the optical device under test in absolute terms from the Jones matrix by computing a ratio of the maximum and minimum values of the one of the a) transmission and b) reflection responses.

18. A method according to claim 17, further comprising the step of computing states of polarization corresponding to the at least one of the maximum and minimum values of the one of the a) transmission and b) reflection responses of the optical device under test.

19. A method for calibrating an instrument to correct for distortion of polarization state caused by an optical network which is not completely polarizing, comprising the steps of:
- producing a polarized light beam having three sequential predetermined states of polarization, corresponding to three input optical electric field Jones vectors;
- impinging the light beam on an optical through;
- measuring one of the a) transmission and b) reflection responses of the optical through to the light beam for each of the three sequential predetermined polarization states by splitting the light beam from the optical through to be measured into four beams, passing three of the beams through optical elements, and measuring the intensities of all four beams;

measuring one of the a) transmitted and b) reflected power of the optical through to the light beam for each of the three sequential predetermined polarization states;

substituting the optical network for the optical through;

impinging the light beam on the optical network;

measuring one of the a) transmission and b) reflection responses of the optical network to the light beam for each of the three sequential predetermined polarization states by measuring the Stokes parameters of the responses of the optical network;

measuring one of the a) transmitted and b) reflected power of the optical network to the light beam for at least one of the three sequential predetermined polarization states;

computing Stokes vectors from the Stokes parameters for the optical network;

converting the Stokes vectors correlated to the responses of the optical network to output optical electric field Jones vectors;

computing a Jones matrix for the optical network from the Jones input and output vectors and the power measurements obtained with the optical through and the optical network;

determining the inverse of the Jones matrix for the optical network; and correcting responses represented by additional output optical electric field Jones vectors obtained during subsequent polarization state measurements according to the inverse of the Jones matrix for the optical network to provide calibrated absolute measurements of said subsequent polarization states notwithstanding any distortion of the state of polarization caused by the optical network.

20. A method according to claim 19, further comprising the steps of:

inserting an optical device under test into the path of the light beam;

measuring one of the a) transmission and b) reflection responses of the optical network and the optical device under test to the light beam for each of the three sequential predetermined polarization states by measuring the Stokes parameters of the responses of the optical network and the optical device under test;

computing second Stokes vectors from the Stokes parameters for the optical network and the optical device under test;

converting the second Stokes vectors correlated to the responses of the optical network and the optical device under test to second output optical electric field Jones vectors;

computing a Jones matrix to within a complex constant for the optical device under test from the Jones input vectors and the second Jones output vectors after multiplication of the second Jones output vectors by the inverse of the matrix for the optical network; and computing a ratio of maximum and minimum values of the one of a) transmission and b) reflection responses of the optical device under test to provide a measurement of the polarization sensitivity of the optical device under test in relative terms from the matrix for the optical device under test.

21. A method according to claim 20, further comprising the step of computing states of polarization corresponding to the at least one of the maximum and minimum values of the one of the a) transmission and b) reflection responses of the optical device under test.

22. A method according to claim 19, further comprising the steps of:

connecting the optical through to the optical network;

measuring one of the a) transmitted and b) reflected power of the optical through and the optical network to the light beam for at least one of the three sequential predetermined polarization states;

substituting an optical device under test for the optical through;

impinging the light beam on the optical device under test;

measuring one of the a) transmission and b) reflection responses of the optical network and the optical device under test to the light beam for each of the three sequential predetermined polarization states by measuring the Stokes parameters of the optical network and the optical device under test;

measuring one of the a) transmitted and b) reflected power of the optical network and the optical device under test to the light beam for at least one of the three sequential predetermined polarization states;

computing second Stokes vectors from the Stokes parameters for the optical network and the optical device under test;

converting the second Stokes vectors correlated to the responses of the optical network and the optical device under test to second output optical electric field Jones vectors;

computing a Jones matrix for the optical device under test from the Jones input vectors and the second Jones output vectors after multiplication of the second Jones output vectors by the inverse of the matrix for the optical network and the power measurements obtained with the optical through, the optical network, and the optical device under test; and providing a measurement of the polarization sensitivity of the optical device under test in absolute terms from the matrix for the optical device under test by computing a ratio of the maximum and minimum values of the one of a) transmission and b) reflection responses.

23. A method according to claim 22, further comprising the step of computing states of polarization corresponding to the at least one of the maximum and minimum values of the one of the a) transmission and b) reflection responses of the optical device under test.

* * * * *